United States Patent
Keller et al.

(10) Patent No.: US 10,618,667 B2
(45) Date of Patent: Apr. 14, 2020

(54) FAN MODULE WITH ADJUSTABLE PITCH BLADES AND POWER SYSTEM

(71) Applicant: Rolls-Royce Corporation, Indianapolis, IN (US)

(72) Inventors: Richard K. Keller, Indianapolis, IN (US); Jonathan S. Sands, Clayton, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 619 days.

(21) Appl. No.: 15/339,155

(22) Filed: Oct. 31, 2016

(65) Prior Publication Data

US 2018/0118363 A1    May 3, 2018

(51) Int. Cl.
| | |
|---|---|
| B64D 35/04 | (2006.01) |
| B64C 11/30 | (2006.01) |
| B64D 41/00 | (2006.01) |
| B64D 27/10 | (2006.01) |

(52) U.S. Cl.
CPC .............. B64D 35/04 (2013.01); B64C 11/30 (2013.01); B64D 27/10 (2013.01); B64D 41/007 (2013.01)

(58) Field of Classification Search
CPC ...... B64D 35/04; B64D 41/007; B64D 27/10; B64C 11/30
See application file for complete search history.

(56) References Cited

U.S. PATENT DOCUMENTS

| | | |
|---|---|---|
| 2,605,849 A | 8/1952 | Bordelon |
| 2,732,019 A | 1/1956 | Stebbins |
| 3,161,237 A | 12/1964 | Szydlowski |
| 4,222,235 A | 9/1980 | Adamson et al. |
| 4,242,864 A | 1/1981 | Cornell et al. |
| 4,258,545 A | 3/1981 | Slater |
| 4,688,995 A | 8/1987 | Wright et al. |
| 4,728,261 A | 3/1988 | Wright et al. |
| 4,734,007 A | 3/1988 | Perry |
| 4,738,589 A | 4/1988 | Wright |
| 4,810,164 A | 3/1989 | Wright |
| 4,936,748 A * | 6/1990 | Adamson ............... F02C 6/206 416/123 |
| 4,968,217 A | 11/1990 | Newton |
| 4,998,995 A | 3/1991 | Blythe et al. |
| 5,090,869 A | 2/1992 | Wright et al. |

(Continued)

FOREIGN PATENT DOCUMENTS

| | | |
|---|---|---|
| DE | 102013209538 A1 | 11/2014 |
| EP | 2962885 A1 | 1/2016 |

(Continued)

OTHER PUBLICATIONS

Extended EP Search Report completed Mar. 28, 2018 and issued in connection with EP Appln. No. 17196502.3.

*Primary Examiner* — Philip J Bonzell
*Assistant Examiner* — Tye William Abell
(74) *Attorney, Agent, or Firm* — Barnes & Thornburg LLP

(57) ABSTRACT

A fan module for an aircraft is disclosed herein. The fan module includes a fan rotor and an optional power supply system. The fan rotor is mounted for rotation about a central axis and configured to couple to a rotational power source. The fan rotor includes a plurality of variable-pitch fan blades each movable from a thrust-generation orientation to a power-generation orientation.

20 Claims, 4 Drawing Sheets

(56) References Cited

U.S. PATENT DOCUMENTS

| | | |
|---|---|---|
| 5,364,231 A | 11/1994 | Eick et al. |
| 5,911,679 A | 6/1999 | Farrell et al. |
| 6,343,768 B1 | 2/2002 | Muldoon |
| 6,748,744 B2 | 6/2004 | Peplow et al. |
| 7,107,756 B2 | 9/2006 | Rolt |
| 7,406,370 B2 | 7/2008 | Kojori et al. |
| 7,584,923 B2 | 9/2009 | Burrage |
| 7,730,714 B2 | 6/2010 | Wood et al. |
| 7,901,185 B2 | 3/2011 | Suciu et al. |
| 8,240,124 B2 | 8/2012 | Colotte et al. |
| 8,322,647 B2 | 12/2012 | Amraly et al. |
| 8,701,381 B2 | 4/2014 | Eames |
| 9,458,844 B2 | 10/2016 | Gieras et al. |
| 9,644,537 B2 | 5/2017 | Suciu et al. |
| 2006/0174629 A1 | 8/2006 | Michalko |
| 2008/0253881 A1 | 10/2008 | Richards |
| 2009/0139202 A1 | 6/2009 | Agrawal et al. |
| 2009/0289456 A1 | 11/2009 | McLoughlin et al. |
| 2009/0289516 A1 | 11/2009 | Hopewell et al. |
| 2010/0047068 A1 | 2/2010 | Parry et al. |
| 2010/0124500 A1 | 5/2010 | Lebrun |
| 2010/0133832 A1 | 6/2010 | Butt |
| 2010/0155526 A1* | 6/2010 | Negulescu ............ B64D 27/08 244/55 |
| 2010/0186418 A1 | 7/2010 | Beutin et al. |
| 2010/0206982 A1 | 8/2010 | Moore et al. |
| 2010/0251726 A1 | 10/2010 | Jones et al. |
| 2012/0128487 A1* | 5/2012 | Eames ................. B64C 11/346 416/1 |
| 2012/0304619 A1 | 12/2012 | Beachy Head |
| 2013/0019585 A1 | 1/2013 | Merry et al. |
| 2013/0104523 A1 | 5/2013 | Kupratis |
| 2014/0260182 A1 | 9/2014 | Suciu et al. |
| 2014/0377079 A1 | 12/2014 | Gieras et al. |
| 2015/0078888 A1 | 3/2015 | Golshany et al. |
| 2015/0274306 A1* | 10/2015 | Sheridan ................... F02C 7/36 60/772 |
| 2016/0023773 A1* | 1/2016 | Himmelmann ........ B64D 27/10 60/778 |
| 2017/0184022 A1* | 6/2017 | Stewart ................... F02C 7/042 |
| 2017/0240286 A1* | 8/2017 | Lemarchand ........... B64C 3/182 |
| 2017/0321601 A1* | 11/2017 | Lafargue ............. B64D 35/08 |
| 2017/0369179 A1* | 12/2017 | Bradbrook ............. B64D 27/12 |
| 2018/0045068 A1* | 2/2018 | Brinson ................ B64D 13/06 |

FOREIGN PATENT DOCUMENTS

| | | |
|---|---|---|
| GB | 2423509 A | 8/2006 |
| WO | 200600113877 A2 | 10/2006 |

\* cited by examiner

FAN MODULE WITH ADJUSTABLE PITCH BLADES AND POWER SYSTEM

FIELD OF THE DISCLOSURE

The present disclosure relates generally to aircraft propulsion systems, and more specifically to fan modules included in aircraft propulsion systems.

BACKGROUND

Aircraft propulsion systems may include gas turbine engines that are used to power the aircraft. Gas turbine engines typically include a compressor, a combustor, and a turbine. The compressor compresses air drawn into the engine and delivers high pressure air to the combustor. In the combustor, fuel is mixed with the high pressure air and the mixture is ignited. Products of the combustion reaction in the combustor are directed into the turbine where work is extracted to drive the compressor and, sometimes, a fan module coupled to the turbine by an output shaft. Left-over products of the combustion reaction are exhausted out of the turbine and may provide thrust in some applications.

Gas turbine engines may be used to power engine accessories and/or aircraft accessories. Depending on flight conditions, gas turbine engines may be required to provide thrust for the aircraft and/or power the accessories. Designing aircraft propulsion systems to satisfy aircraft thrust requirements while providing adequate power for accessories during various flight conditions remains an area of interest.

SUMMARY

The present disclosure may comprise one or more of the following features and combinations thereof.

According to one aspect of the present disclosure, a fan module may include a fan rotor and a power supply system. The fan rotor may be mounted for rotation about a central axis and configured to couple to a rotational power source, and the fan rotor may include a plurality of variable-pitch fan blades each movable from a thrust-generation orientation to a power-generation orientation. The power supply system may include a torque transmitting device configured to selectively couple the fan rotor to the rotational power source so that rotation of the fan rotor is driven by the rotational power source, a generator coupled to the fan rotor and configured to produce electrical power in response to a mechanical load applied by the fan rotor to the generator, an actuator coupled to the plurality of variable-pitch fan blades to move the fan blades from the thrust-generation orientation to the power-generation orientation, and a controller coupled to the torque transmitting device, the generator, and the actuator. The controller may be configured to disengage the torque transmitting device to de-couple the fan rotor from the rotational power source and to move the variable-pitch fan blades to the power-generation orientation when the mechanical load is applied to the generator so that the fan rotor is free to rotate about the central axis and is aerodynamically optimized to rotate in response to ram air interacting with the fan rotor.

In some embodiments, the controller may be configured to disengage the torque transmitting device and to move the variable-pitch fan blades to the power-generation orientation so that pressurized air discharged by the fan blades when the fan blades are in the power-generation orientation is not generally directed along the central axis to produce thrust.

The controller may be configured to engage the torque transmitting device so that the fan rotor is driven to rotate about the central axis by the rotational power source and to control the actuator such that the plurality of variable-pitch fan blades are in the thrust-generation orientation so that pressurized air discharged by the fan blades when the fan blades are in the thrust-generation orientation is generally directed along the central axis to produce thrust. Additionally, in some embodiments, the controller may be configured to disengage the torque transmitting device in a power mode of the fan module associated with relatively-low thrust conditions and to engage the torque transmitting device in a thrust mode of the fan module associated with relatively-high thrust conditions.

In some embodiments, the power supply system may include a second torque transmitting device coupled between the fan rotor and the generator, and the controller may be configured to control operation of the second torque transmitting device to selectively transmit rotation from the fan rotor to the generator. The controller may be configured to at least partially engage the second torque transmitting device to transmit rotation from the fan rotor to the generator so that the mechanical load is applied by the fan rotor to the generator to cause the generator to produce electrical power when the variable-pitch fan blades are moved to the power-generation orientation. The controller may be configured to disengage the second torque transmitting device to de-couple the fan rotor from the generator so that the mechanical load is not applied by the fan rotor to the generator and the generator does not produce electrical power when the plurality of variable-pitch fan blades are in the thrust-generation orientation. The controller may be configured to monitor a load experienced by the generator when the plurality of variable-pitch fan blades are moved to the power-generation orientation and to adjust engagement of the second torque transmitting device based on the monitored load.

According to another aspect of the present disclosure, a fan module may include a fan rotor and a power supply system. The fan rotor may be mounted for rotation about a central axis and configured to couple to a rotational power source, and the fan rotor may include a plurality of variable-pitch fan blades each movable from a thrust-generation orientation to a power-generation orientation. The power supply system may include a generator coupled to the fan rotor and configured to produce electrical power in response to a mechanical load applied by the fan rotor to the generator and a controller coupled to the generator. The controller may be configured to cause the fan rotor to be de-coupled from the rotational power source and to cause movement of the plurality of variable-pitch fan blades to the power-generation orientation when the mechanical load is applied to the generator so that the fan rotor is free to rotate about the central axis in response to interacting with ram air.

In some embodiments, the power supply system may include a torque transmitting device configured to selectively couple the fan rotor to the rotational power source so that rotation of the fan rotor is driven by the rotational power source, and the controller may be configured to disengage the torque transmitting device to cause the fan rotor to be de-coupled from the rotational power source when the mechanical load is applied to the generator. Additionally, in some embodiments, the power supply system may include an actuator coupled to the plurality of variable-pitch fan blades to move the fan blades from the thrust-generation orientation to the power-generation orientation, and the controller may be configured to control the actuator to cause movement of the fan blades to the power-generation orientation when the mechanical load is applied to the generator.

In some embodiments, the power supply system may include a torque transmitting device coupled between the fan rotor and the generator, and the controller may be configured to control operation of the torque transmitting device to selectively transmit rotation from the fan rotor to the generator. The controller may be configured to at least partially engage the torque transmitting device to transmit rotation from the fan rotor to the generator so that the mechanical load is applied by the fan rotor to the generator to cause the generator to produce electrical power when the variable-pitch fan blades are moved to the power-generation orientation. The controller may be configured to disengage the torque transmitting device to de-couple the fan rotor from the generator so that the mechanical load is not applied by the fan rotor to the generator and the generator does not produce electrical power when the plurality of variable-pitch fan blades are in the thrust-generation orientation. The controller may be configured to monitor a load experienced by the generator when the plurality of variable-pitch fan blades are moved to the power-generation orientation and to adjust engagement of the torque transmitting device based on the monitored load.

According to yet another aspect of the present disclosure, an aircraft may include an airframe, a gas turbine engine supported by the airframe, and a fan module supported by the airframe. The fan module may have a fan rotor and a power supply system. The fan rotor may be selectively coupled to the gas turbine engine and mounted for rotation about a central axis, and the fan rotor may have a plurality of variable-pitch fan blades each movable from a thrust-generation orientation to a power-generation orientation. The power supply system may include a torque transmitting device configured to couple the fan rotor to the gas turbine engine so that the gas turbine engine drives rotation of the fan rotor when the plurality of variable-pitch fan blades are in the thrust-generation orientation, a generator coupled to the fan rotor and configured to produce electrical power in response to a mechanical load applied by the fan rotor to the generator, and a controller coupled to the torque transmitting device and the generator. The controller may be configured to disengage the torque transmitting device to de-couple the fan rotor from the rotational power source and to cause movement of the variable-pitch fan blades to the power-generation orientation when the mechanical load is applied to the generator so that the fan rotor is free to rotate about the central axis in response to interacting with ram air.

In some embodiments, the gas turbine engine may be located forward of the fan module along the central axis. Additionally, in some embodiments, the power supply system may include a second torque transmitting device coupled between the fan rotor and the generator, and the controller may be configured to at least partially engage the second torque transmitting device to transmit rotation from the fan rotor to the generator so that the mechanical load is applied by the fan rotor to the generator to cause the generator to produce electrical power when the variable-pitch fan blades are moved to the power-generation orientation. The controller may be configured to disengage the second torque transmitting device to de-couple the fan rotor from the generator so that the mechanical load is not applied by the fan rotor to the generator and the generator does not produce electrical power when the plurality of variable-pitch fan blades are in the thrust-generation orientation. The controller may be configured to monitor a load experienced by the generator when the plurality of variable-pitch fan blades are moved to the power-generation orientation and to adjust engagement of the second torque transmitting device based on the monitored load.

These and other features of the present disclosure will become more apparent from the following description of the illustrative embodiments.

DETAILED DESCRIPTION

Figure 1:
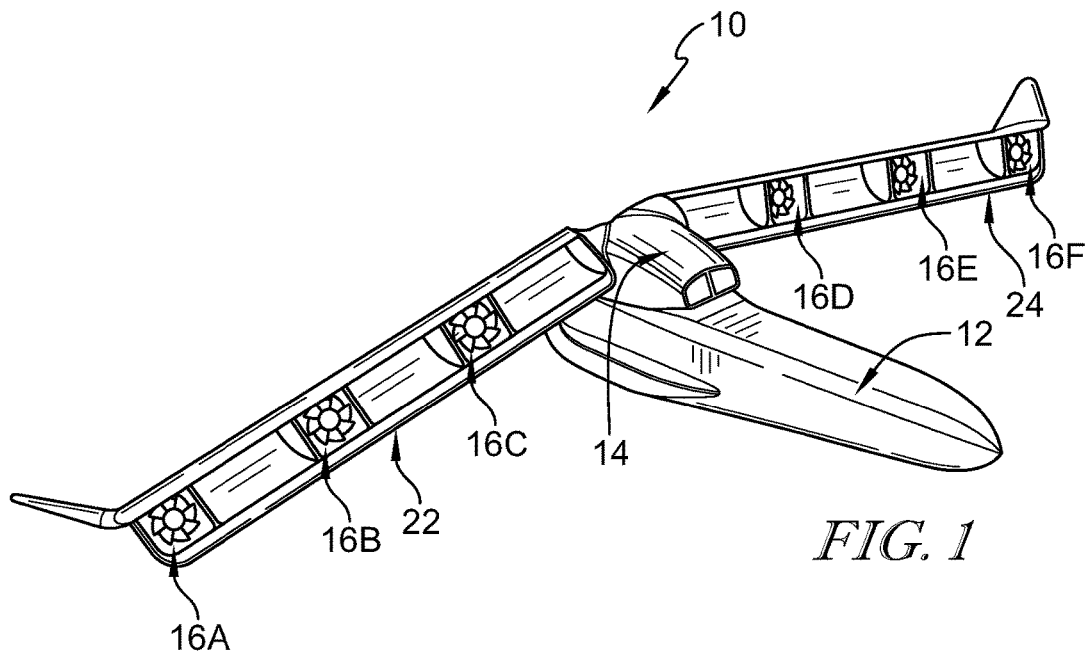
FIG. 1 is a perspective view of an aircraft showing that the aircraft includes an airframe, a gas turbine engine supported by the airframe, and fan modules supported by the airframe.

For the purposes of promoting an understanding of the principles of the disclosure, reference will now be made to a number of illustrative embodiments illustrated in the drawings and specific language will be used to describe the same.

Figure 2:
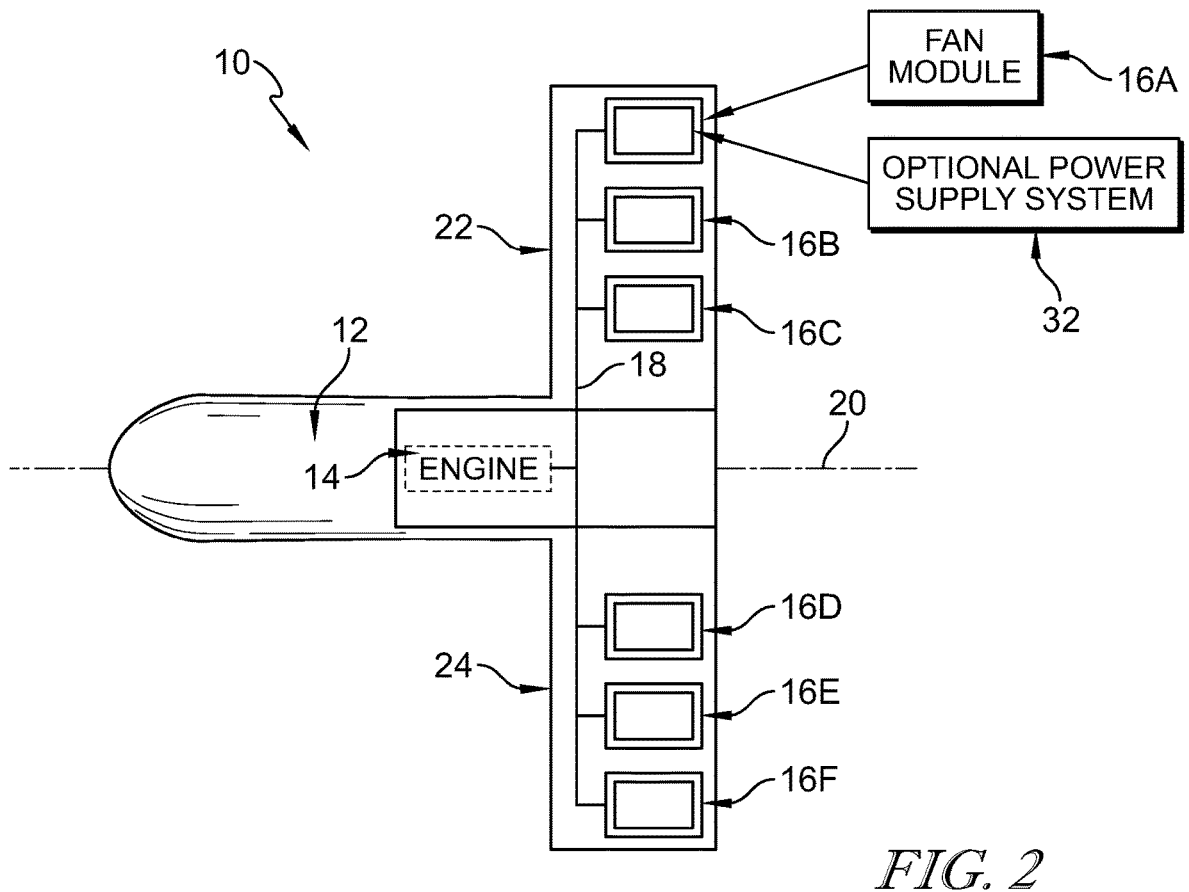
FIG. 2 is a top view of the aircraft of FIG. 1 showing that the gas turbine engine is coupled to the fan modules to drive the fan modules and showing that each fan module includes an optional power supply system.

Referring now to FIGS. 1 and 2, an illustrative aircraft 10 includes an airframe 12 and a gas turbine engine 14 supported by the airframe 12. The gas turbine engine 14 is configured to drive at least one fan module 16 included in the aircraft 10 via an output shaft 18 that couples the engine 14 to the fan module 16. The gas turbine engine 14 is illustratively located forward of the fan module 16 along a central axis 20.

In the illustrative embodiment, the aircraft 10 includes six substantially identical fan modules 16A, 16B, 16C, 16D, 16E, 16F as shown in FIGS. 1 and 2. The fan modules 16A, 16B, 16C are distributed along a wing 22 of the aircraft 10, and the fan modules 16D, 16E, 16F are distributed along a wing 24 of the aircraft 10. The gas turbine engine 14 is illustratively configured to drive each of the fan modules 16A, 16B, 16C, 16D, 16E, 16F.

Figure 6:
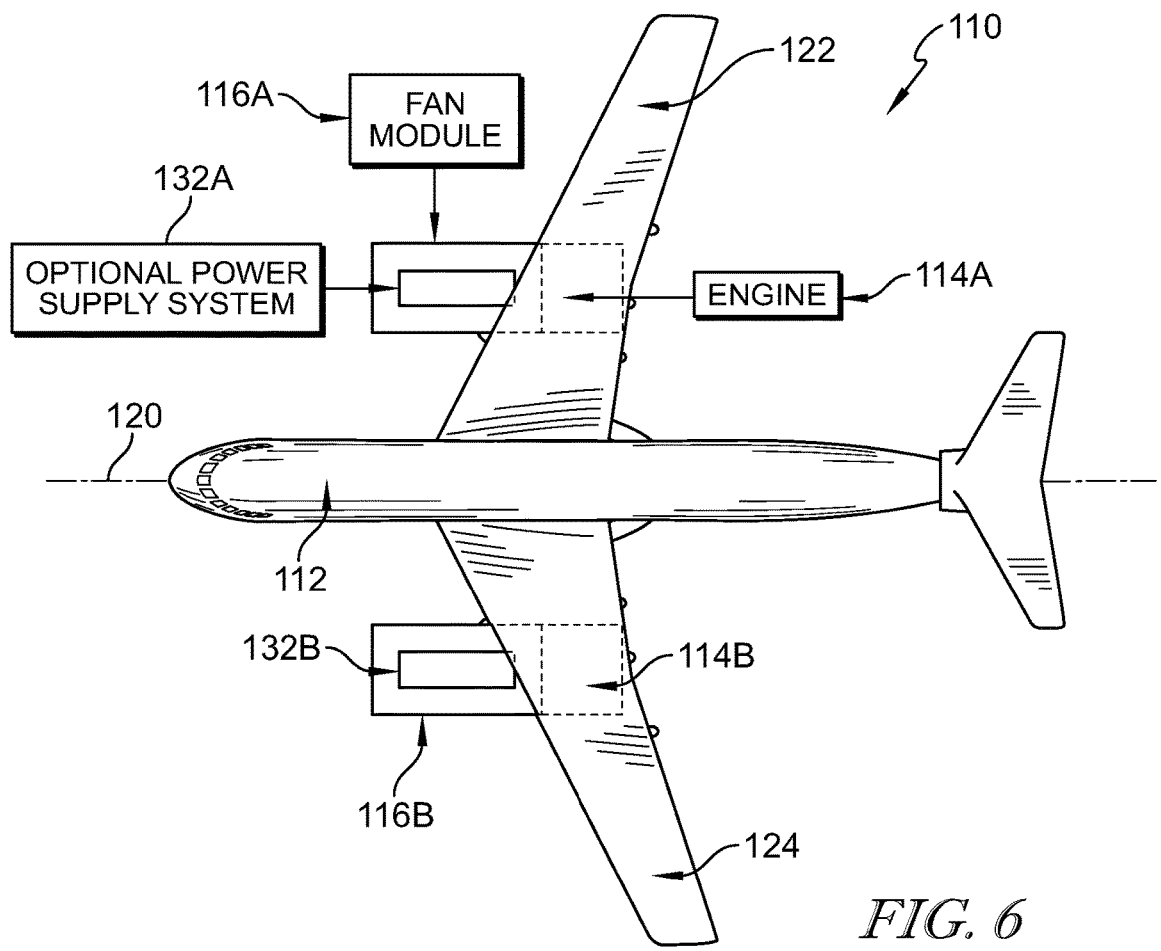
FIG. 6 is a perspective view of another aircraft showing that the aircraft includes an airframe, a pair of gas turbine engines supported by the airframe, and fan modules supported by the airframe, arranged forward of each of the gas turbine engines along a central axis, and each having an optional power supply system.
Figure 7:
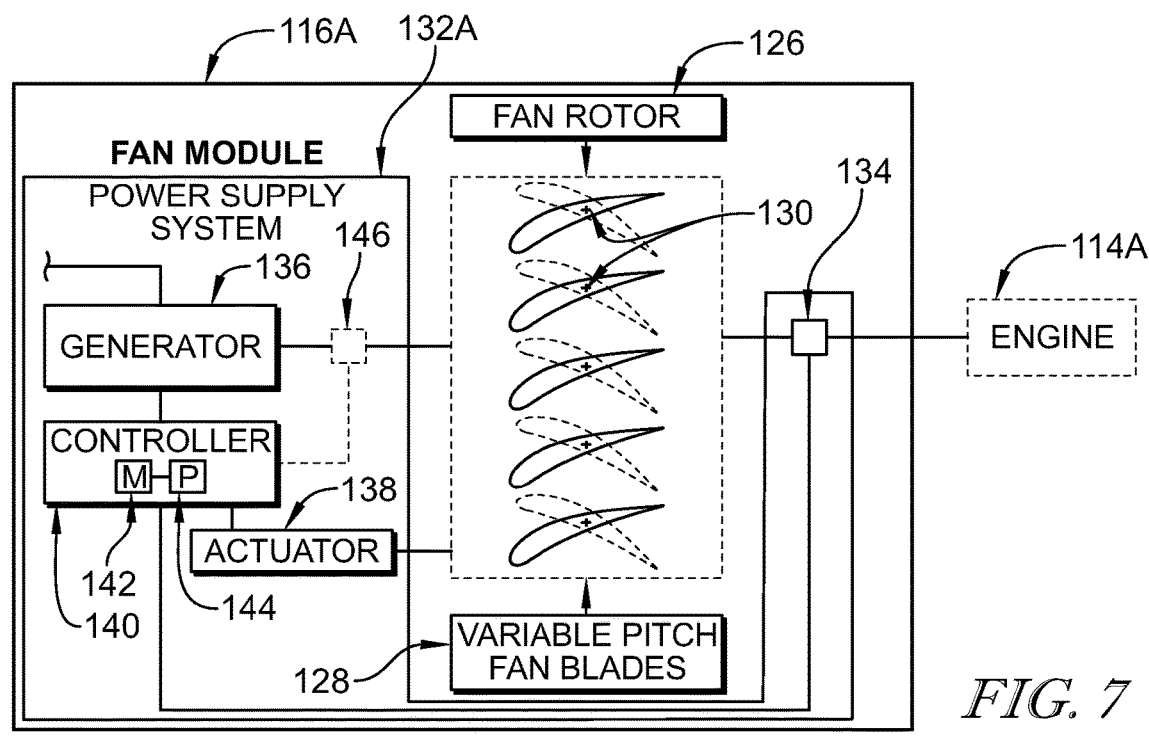
FIG. 7 is a partially diagrammatic view of one of the fan modules depicted in FIG. 6 showing the fan module includes a fan rotor having variable-pitch fan blades, and showing that the power supply system has a torque transmitting device configured to selectively couple the fan rotor to the gas turbine engine, a generator selectively coupled to the fan rotor, an actuator coupled to the variable-pitch fan blades, and a controller coupled to the torque transmitting device, the generator, and the actuator.

In other embodiments, the aircraft 10 may include another suitable number of gas turbine engines that may be distributed about the aircraft 10 (e.g., along the wings 22, 24) to provide one or more distributed propulsion systems. Additionally, in other embodiments, the aircraft 10 may include another suitable number of fan modules that may be distributed along the wings 22, 24 and driven by the gas turbine engines. Finally, in other embodiments, the gas turbine engine 14 and the fan module 16 may be arranged relative to one another in another suitable arrangement. For example, in some embodiments, the fan modules 16A, 16B, 16C, 16D, 16E, 16F may be arranged forward of the engine 14 along the central axis 20 in similar fashion to the arrangement of the fan modules 116A, 116B relative to the engines 114A, 114B along the central axis 120 as shown in FIGS. 6 and 7.

Figure 3:
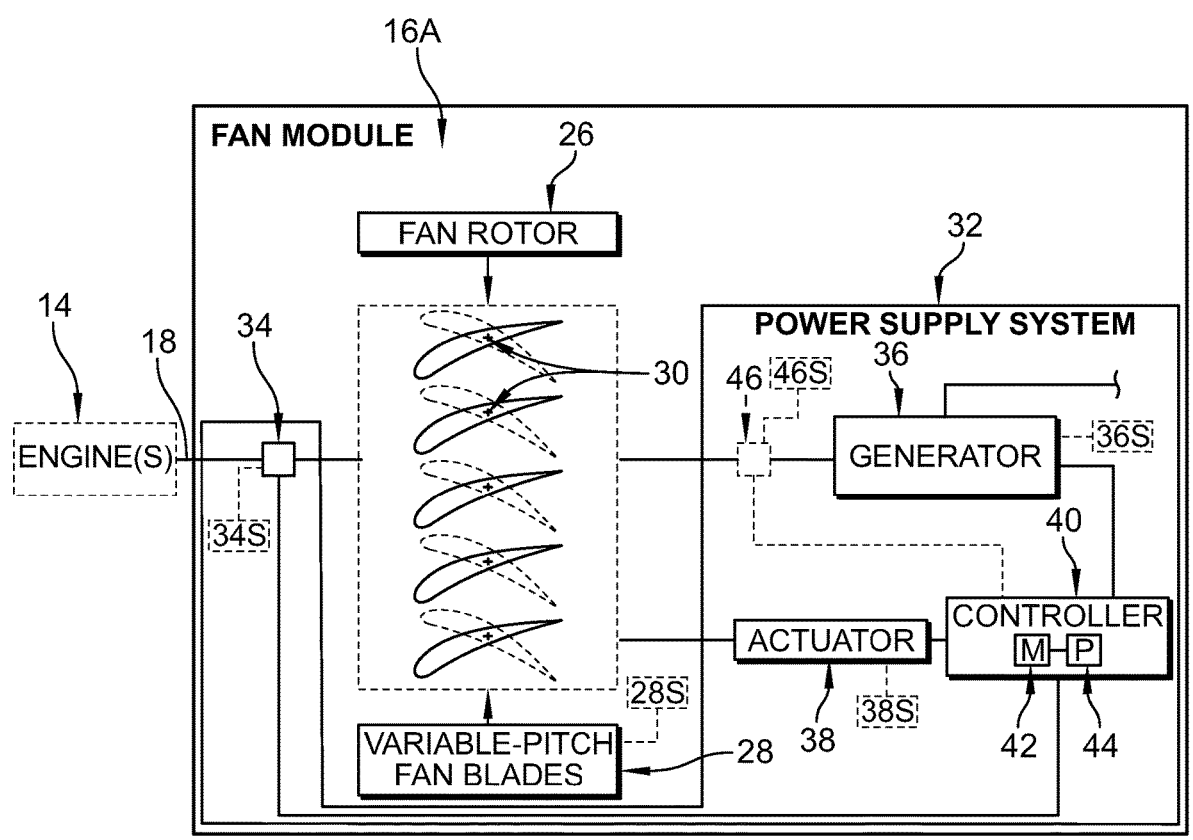
FIG. 3 is a partially diagrammatic view of the aircraft of FIG. 2 showing that each fan module includes a fan rotor having variable-pitch fan blades, and showing that the power supply system includes a torque transmitting device configured to selectively couple the fan rotor to the gas turbine engine, a generator selectively coupled to the fan rotor, an actuator coupled to the variable-pitch fan blades, and a controller coupled to the torque transmitting device, the generator, and the actuator.
Figure 4:
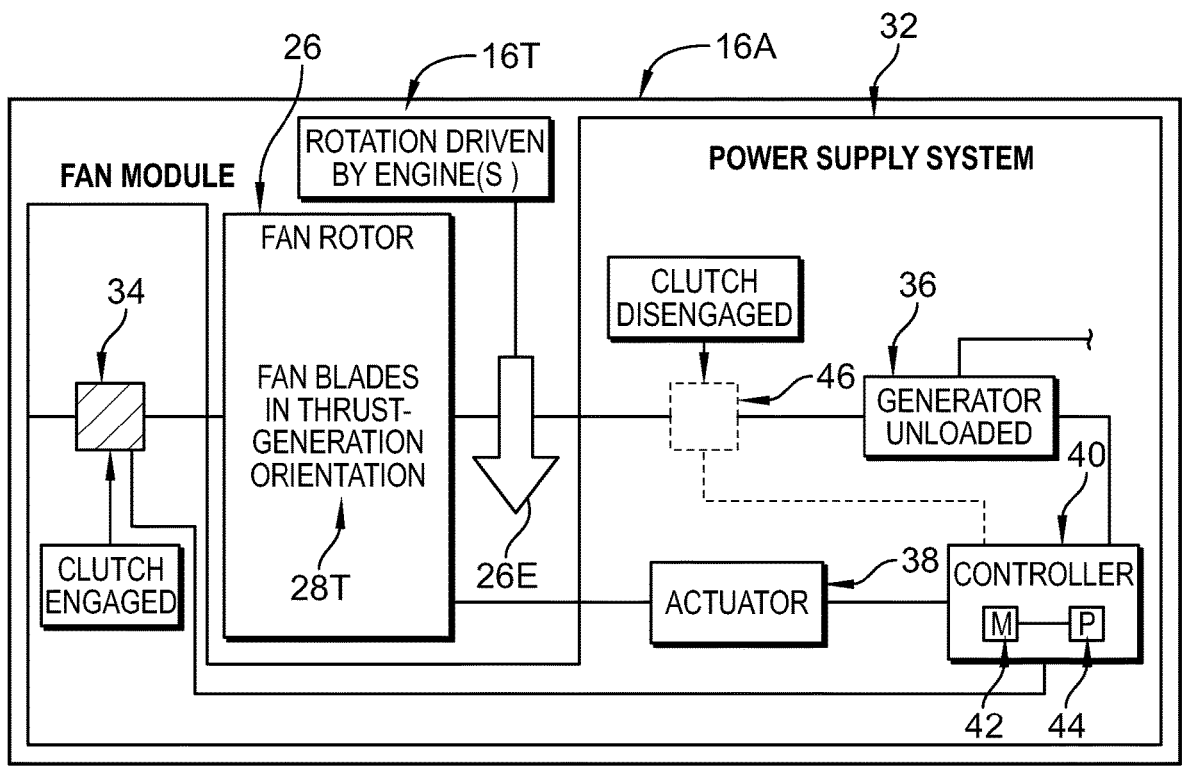
FIG. 4 is a diagrammatic view of the fan module depicted in FIG. 3 showing the variable-pitch fan blades in a thrust-generation orientation associated with operation of the fan module in a thrust mode in which the controller engages the torque transmitting device to couple the fan rotor to the gas turbine engine and de-couples the fan rotor from the generator so that the generator does not produce electrical power.
Figure 5:
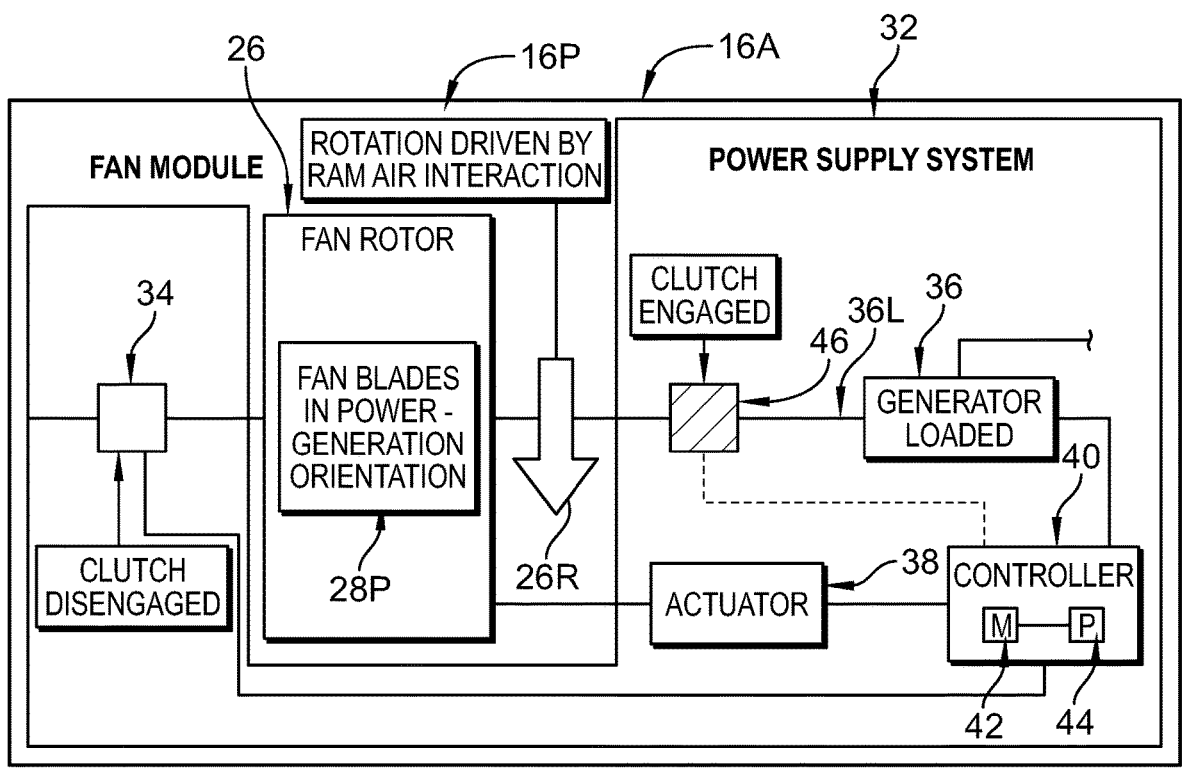
FIG. 5 is a diagrammatic view of the fan module depicted in FIG. 3 showing the variable-pitch fan blades in a power-generation orientation associated with operation of the fan module in a power mode in which the controller disengages the torque transmitting device to de-couple the fan rotor from the gas turbine engine and couples the fan rotor to the generator so that the generator produces electrical power in response to a mechanical load applied thereto by the fan rotor.

Referring now to FIG. 3, the illustrative fan module 16A includes a fan rotor 26 mounted for rotation about the central axis 20. The fan rotor 26 is driven to rotate about the axis 20 substantially by the gas turbine engine 14 as shown in FIG. 4 or substantially by ram air interaction as shown in FIG. 5. The fan rotor 26 includes variable-pitch fan blades 28 that are configured for rotation about blades axes 30. Specifically, the blades 28 are configured for rotation about the axes 30 from a thrust-generation orientation 28T shown in FIG. 4 to a power-generation orientation 28P shown in FIG. 5.

The illustrative fan module 16A also includes an optional power supply system 32 as shown in FIGS. 2 and 3. The power supply system 32 has a torque transmitting device 34, a generator 36, an actuator 38, and a controller 40. The torque transmitting device 34 is configured to selectively couple the fan rotor 26 to the gas turbine engine 14 so that the rotation of the fan rotor 26 is driven by the engine 14. The generator 36 is coupled to the fan rotor 26 and configured to produce electrical power in response to a mechanical load 36L applied by the fan rotor 26 to the generator 36. The actuator 38 is coupled to the variable-pitch fan blades 28 to move the blades 28 from the thrust-generation orientation 28T to the power-generation orientation 28P. The controller 40 is coupled to the torque transmitting device 34, the generator 36, and the actuator 38. The controller 40 is configured to engage the device 34 during operation of the fan module 16A in a thrust mode 16T and disengage the device 34 during operation of the fan module 16A in a power mode 16P.

The thrust mode 16T of the fan module 16A is illustratively associated with relatively-high thrust conditions. In the thrust mode 16T, the controller 40 controls the actuator 38 such that the variable-pitch fan blades 28 are in the thrust-generation orientation 28T so that pressurized air discharged by the blades 28 is generally directed along the central axis 20 to produce thrust. Additionally, the controller 40 engages the torque transmitting device 34 in the thrust mode 16T as shown in FIG. 4 so that the fan rotor 26 is driven to rotate about the axis 20 by the gas turbine engine 14. However, because the generator 36 is de-coupled from the fan rotor 26 in the thrust mode 16T, the fan rotor 26 does not apply the mechanical load 36L to the generator 36 to cause the generator 36 to produce electrical power.

The power mode 16P of the fan module 16A is illustratively associated with relatively-low thrust conditions. In the thrust mode 16P, the controller 40 controls the actuator 38 to move the variable-pitch fan blades 28 to the power-generation orientation 28P so that pressurized air discharged by the blades 28 is not generally directed along the central axis 20 to produce thrust. Additionally, the controller 40 disengages the torque transmitting device 34 in the power mode 16P as shown in FIG. 5 to de-couple the fan rotor 26 from the gas turbine engine 14. The fan rotor 26 is aerodynamically optimized to rotate in response to ram air interacting with the fan rotor 26 in the power mode 16P. Because the generator 36 is coupled to the fan rotor 26 in the mode 16P, the mechanical load 36L is applied to the generator 36 to cause the generator 36 to produce electrical power that may be supplied to accessories of the engine 14 and/or the aircraft 10. As such, the fan rotor 26 may be said to act as a ram air turbine (RAT) during operation of the fan module 16A in the power mode 16P.

In the illustrative embodiment, the torque transmitting device 34 is coupled between the gas turbine engine 14 and the fan rotor 26 as shown in FIG. 3. The torque transmitting device 34 may be embodied as, or otherwise includes, a device configured to selectively transmit rotation from the gas turbine engine 14 to the fan rotor 26. For instance, the torque transmitting device 34 may be embodied as, or otherwise include, a friction clutch, a hydrodynamic clutch, an electromagnetic clutch, a magnetic particle clutch, or the like.

In the illustrative embodiment, the generator 36 is embodied as, or otherwise includes, a device configured to convert mechanical energy (i.e., rotational power) into electrical power as shown in FIG. 5. The generator 36 is embodied as, or otherwise includes, a device configured to convert rotational power provided by the fan rotor 26 into electrical power for use by direct current (DC) and/or alternating current (AC) accessories of the gas turbine engine 14 and/or the aircraft 10.

In the illustrative embodiment, the actuator 38 is embodied as, or otherwise includes, a device configured to move the variable-pitch fan blades 28 from the thrust-generation orientation 28T to the power-generation orientation 28P and vice versa as shown in FIGS. 4 and 5. In some embodiments, the actuator 38 may be embodied as, or otherwise include, a hydraulically-operated actuator such as a hydraulic piston. In other embodiments, the actuator 38 may be embodied as, or otherwise include, an electrically-powered actuator such as an electrically-powered linear actuator or a rotary servo actuator. In other embodiments still, the actuator 38 may be embodied as, or otherwise include, a pneumatically-powered actuator. Finally, in other embodiments, the actuator 38 may be embodied as, or otherwise include, a fueldraulic actuator.

In the illustrative embodiment, the controller 40 is embodied as, or otherwise includes, a device configured to control operation of the power supply system 32 (i.e., the torque transmitting device 34, the generator 36, the actuator 38, and any other components included therein). The controller 40 includes memory 42 and a processor 44 coupled to the memory 42 as shown in FIG. 3. The memory 42 includes instructions that, when executed by the processor 44, cause the processor 44 to perform various actions to control the components of the system 32.

In some embodiments, the power supply system 32 may include an optional torque transmitting device 46 coupled between the fan rotor 26 and the generator 36 as shown in FIG. 3. The torque transmitting device 46 may be embodied as, or otherwise include, a device configured to selectively transmit rotation from the fan rotor 26 to the generator 36. For instance, the torque transmitting device 46 may be embodied as, or otherwise include, a friction clutch, a hydrodynamic clutch, an electromagnetic clutch, a magnetic particle clutch, or the like. The torque transmitting device 46 may be coupled to the controller 40 and the controller 40 may be configured to control operation of the device 46.

In other embodiments, the torque transmitting device 46 may be omitted from the power supply system 32. In such embodiments, rather than being coupled indirectly to the generator 36 through the device 46 as shown in FIGS. 3-5, the fan rotor 26 would be directly coupled to the generator 36.

In some embodiments, the power supply system 32 may include one or more devices configured to monitor components of the system 32. In one example, the power supply system 32 may include a sensor 36S coupled to the generator 36 and configured to monitor one or more operational parameters of the generator 36 as shown in FIG. 3. For instance, the sensor 36S may be configured to monitor the load experienced by the generator 36 during operation of the fan module 16A.

In another example, the power supply system 32 may include a sensor 38S coupled to the actuator 38 and configured to monitor one or more operational parameters of the actuator 38 as shown in FIG. 3. For instance, the sensor 38S may be configured to monitor the positional state of the actuator 38. In yet another example, the power supply system 32 may include one or more sensors 28S coupled to the variable-pitch fan blades 28 and configured to monitor one or more operational parameters of the blades 28. For instance, the one or more sensors 28S may be configured to monitor the orientation of the blades 28.

In yet another example, the power supply system 32 may include sensors 34S, 46S respectively coupled to the torque transmitting devices 34, 46 and configured to monitor one or more operational parameters of the devices 34, 46 as shown in FIG. 3. For instance, the sensors 34S, 46S may be configured to monitor the engagement states of the torque transmitting devices 34, 46.

In some embodiments, the illustrative power supply system 32 may be adapted for use in an electric propulsion system, such as a distributed electric propulsion system. In such embodiments, the electric propulsion system may be operated in some situations to drive a load and in other situations to provide a generator that produces electrical power that may be supplied to accessories of the propulsion system and/or the vehicle carrying the propulsion system.

In some embodiments, some of the fan modules 16A, 16B, 16C, 16D, 16E, 16F may be driven by the gas turbine engine 14, while other of the fan modules 16A, 16B, 16C, 16D, 16E, 16F may not be driven by the engine 14. Some of the fan modules 16A, 16B, 16C, 16D, 16E, 16F may be driven by the engine 14 to produce thrust, whereas other of the fan modules 16A, 16B, 16C, 16D, 16E, 16F may be driven in response to ram air interaction to produce electrical power.

Referring now to FIGS. 4 and 5, operation of the fan module 16A will be described in detail. Specifically, operation of the fan module 16A in the thrust mode 16T is described below with reference to FIG. 4 and operation of the module 16A in the power mode 16P is described below with reference to FIG. 5.

During operation of the fan module 16A in the thrust mode 16T, the controller 40 controls the power supply system 32 to prevent production of electrical power by the generator 36 as shown in FIG. 4. The instructions stored in the memory 42 are executed by the processor 44 to cause the processor 44 to control the actuator 38 such that the variable-pitch fan blades 28 are in the thrust-generation orientation 28T in the mode 16T. Additionally, the instructions stored in the memory 42 are executed by the processor 44 to cause the processor 44 to engage the torque transmitting device 34 to couple the fan rotor 26 to the gas turbine engine 14 in the mode 16T. Rotation of the fan rotor 26 is consequently driven by the engine 14 as indicated by arrow 26E. Finally, the instructions stored in the memory 42 may be executed by the processor 44 to cause the processor 44 to disengage the torque transmitting device 46 to de-couple the fan rotor 26 from the generator 36 in the mode 16T. Because the generator 36 is de-coupled from the fan rotor 26 such that the mechanical load 36L is not applied to the generator 36 by the fan rotor 26, the fan rotor 26 is unable to drive the generator 36 to produce electrical power in the mode 16T.

During operation of the fan module 16A in the power mode 16P, the controller 40 controls the power supply system 32 to allow production of electrical power by the generator 36 as shown in FIG. 5. The instructions stored in the memory 42 are executed by the processor 44 to cause the processor 44 to control the actuator 38 to move the variable-pitch fan blades 28 to the power-generation orientation 28P in the mode 16P. Additionally, the instructions stored in the memory 42 are executed by the processor 44 to cause the processor 44 to disengage the torque transmitting device 34 to de-couple the fan rotor 26 from the gas turbine engine 14 in the mode 16P. As a result, rotation of the fan rotor 26 is driven by interaction with ram air as indicated by arrow 26R. Finally, the instructions stored in the memory 42 may be executed by the processor 44 to cause the processor 44 to at least partially engage the torque transmitting device 46 such that the mechanical load 36L is applied to the generator 36 by the fan rotor 26. Application of the mechanical load 36L to the generator 36 causes the generator 36 to produce electrical power in the mode 16P.

During operation of the fan module 16A in the power mode 16P, the controller 40 may control the power supply system 32 to adjust engagement of the torque transmitting device 46 as suggested by FIG. 5. The instructions stored in the memory 42 may be executed by the processor 44 to cause the processor 44 to monitor a load experienced by the generator 36 in the mode 16P. The instructions stored in the memory 42 also may be executed by the processor 44 to cause the processor 44 to adjust engagement of the torque transmitting device 46 based on the monitored load of the generator 36 in the mode 16P. For example, the instructions stored in the memory 42 may be executed by the processor 44 to cause the processor 44 to adjust engagement of the device 46 so that the monitored load of the generator 36 does not exceed a maximum load thereof.

Future configurations of turbofan-powered air vehicles (e.g., the aircraft 10) may have greater power offtake requirements (e.g., power supplied to the accessories by the generator 36) than in current configurations. Increasing power offtake requirements may increase the demand placed upon propulsion systems (e.g., the gas turbine engine 14 and the fan modules 16) such that compromises in mission systems and/or mission performance capabilities may be required to provide adequate thrust and power offtake. Such compromises may be necessary at high altitude flight conditions where achieving engine power offtake requirements may be more demanding of propulsion systems than achieving thrust requirements at altitude. In some situations, operators may be required to choose between flying at high altitude conditions and shutting down electronic systems or flying at altitude and powering electronic systems.

Oversizing a turbofan propulsion system to provide adequate thrust and power offtake may be undesirable in some situations. The present disclosure may provide a design of a turbofan propulsion system that avoids the drawbacks associated with such oversizing while satisfying thrust and power offtake requirements.

The present design may employ variable-pitch technology (e.g., the actuator 38 and the variable-pitch fan blades 28) to extract energy from flow to the fan rotor 26 instead of adding energy to the flow. During normal operation (e.g., the thrust mode 16P shown in FIG. 4), the fan pitch (e.g., the pitch of the blades 28 associated with the thrust-generation orientation 28T) may be selected to provide adequate thrust. During low-thrust and/or high-power-offtake conditions (e.g., the power mode 16P shown in FIG. 5), the fan pitch may be adjusted (e.g., movement of the blades 28 from the orientation 28T to the power-generation orientation 28P) so that the fan acts as a RAT. During low-thrust and/or high-power-offtake conditions, rotational power extracted from the flow by the fan may be used to power an electric generator (e.g., generator 36) to power accessories and/or charge a fuel cell.

Augmentation of inlet and/or exhaust areas may be used to minimize possible negative impacts on performance. In particular, inlet/exhaust area modification may be used to minimize ram drag, spillage drag, and boat tail drag.

The present design may be used in a wide range of air vehicle applications including single and multi-engine applications as well as both distributed mechanical and electrical applications. Use of the present design in a distributed electric propulsion system application may allow the propulsion system to be used in regenerative cycles, in similar fashion to regenerative braking of hybrid vehicles. In some applications, use of the present design may allow one or more fans to be disconnected from the gas turbine engine(s) driving the fans, thereby allowing the engine(s) to throttle back and the fans to act as turbines in order to charge power cells or power electronic systems. Use of the present design in a distributed mechanical propulsion system application may involve one or more fans being clutched, thereby allowing one or more fans to be operated in RAT mode to extract power from the flow instead of producing thrust.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan module comprising
a fan rotor mounted for rotation about a central axis and configured to couple to a rotational power source, the fan rotor including a plurality of variable-pitch fan blades each movable from a thrust-generation orientation to a power-generation orientation, and
a power supply system including a torque transmitting device configured to selectively couple the fan rotor to the rotational power source so that rotation of the fan rotor is driven by the rotational power source, a generator coupled to the fan rotor and configured to produce electrical power in response to a mechanical load applied by the fan rotor to the generator, an actuator coupled to the plurality of variable-pitch fan blades to move the fan blades from the thrust-generation orientation to the power-generation orientation, and a controller coupled to the torque transmitting device, the generator, and the actuator,
wherein the controller is configured to disengage the torque transmitting device to de-couple the fan rotor from the rotational power source and to move the variable-pitch fan blades to the power-generation orientation in high-altitude flight conditions so that the mechanical load is applied to the generator from the fan rotor in response to ram air interacting with the fan rotor and driving the fan rotor to rotate about the central axis.

2. The fan module of claim 1, wherein the controller is configured to disengage the torque transmitting device in a power mode of the fan module and to engage the torque transmitting device in a thrust mode of the fan module.

3. The fan module of claim 1, wherein the controller is configured to disengage the torque transmitting device and to move the variable-pitch fan blades to the power-generation orientation so that pressurized air discharged by the fan blades when the fan blades are in the power-generation orientation is not substantially directed along the central axis to produce thrust.

4. The fan module of claim 3, wherein the controller is configured to engage the torque transmitting device so that the fan rotor is driven to rotate about the central axis by the rotational power source and to control the actuator such that the plurality of variable-pitch fan blades are in the thrust-generation orientation so that pressurized air discharged by the fan blades when the fan blades are in the thrust-generation orientation is substantially directed along the central axis to produce thrust.

5. The fan module of claim 1, wherein the power supply system includes a second torque transmitting device coupled between the fan rotor and the generator and the controller is configured to control operation of the second torque transmitting device to selectively transmit rotation from the fan rotor to the generator.

6. The fan module of claim 5, wherein the controller is configured to engage the second torque transmitting device to transmit rotation from the fan rotor to the generator so that the mechanical load is applied by the fan rotor to the generator to cause the generator to produce electrical power when the variable-pitch fan blades are moved to the power-generation orientation.

7. The fan module of claim 6, wherein the controller is configured to disengage the second torque transmitting device to de-couple the fan rotor from the generator so that the mechanical load is not applied by the fan rotor to the generator and the generator does not produce electrical power when the plurality of variable-pitch fan blades are in the thrust-generation orientation.

8. The fan module of claim 7, wherein the controller is configured to monitor a load experienced by the generator when the plurality of variable-pitch fan blades are moved to the power-generation orientation and to adjust engagement of the second torque transmitting device based on the monitored load.

9. A fan module comprising
a fan rotor mounted for rotation about a central axis and configured to couple to a rotational power source, the fan rotor including a plurality of variable-pitch fan blades each movable from a thrust-generation orientation, in which the plurality of variable-pitch fan blades are oriented to provide thrust, to a power-generation orientation, in which the plurality of variable pitch blades are oriented to be driven in rotation about the central axis by ram air, and a power supply system including a generator coupled to the fan rotor and configured to produce electrical power in response to a mechanical load applied by the fan rotor to the generator and a controller coupled to the generator, wherein the controller is configured to cause the fan rotor to be de-coupled from the rotational power source and to cause movement of the plurality of variable-pitch fan blades to the power-generation orientation so that the mechanical load is applied to the generator from the fan rotor and the fan rotor is free to rotate about the central axis in response to interacting with the ram air.

10. The fan module of claim 9, wherein the power supply system includes a torque transmitting device configured to selectively couple the fan rotor to the rotational power source so that rotation of the fan rotor is driven by the rotational power source and the controller is configured to disengage the torque transmitting device to cause the fan rotor to be de-coupled from the rotational power source when the mechanical load is applied to the generator.

11. The fan module of claim 9, wherein the power supply system includes an actuator coupled to the plurality of variable-pitch fan blades to move the fan blades from the thrust-generation orientation to the power-generation orientation and the controller is configured to control the actuator to cause movement of the fan blades to the power-generation orientation when the mechanical load is applied to the generator.

12. The fan module of claim 9, wherein the power supply system includes a torque transmitting device coupled between the fan rotor and the generator and the controller is configured to control operation of the torque transmitting device to selectively transmit rotation from the fan rotor to the generator.

13. The fan module of claim 12, wherein the controller is configured to engage the torque transmitting device to transmit rotation from the fan rotor to the generator so that the mechanical load is applied by the fan rotor to the generator to cause the generator to produce electrical power when the variable-pitch fan blades are moved to the power-generation orientation.

14. The fan module of claim 13, wherein the controller is configured to disengage the torque transmitting device to de-couple the fan rotor from the generator so that the mechanical load is not applied by the fan rotor to the generator and the generator does not produce electrical power when the plurality of variable-pitch fan blades are in the thrust-generation orientation.

15. The fan module of claim 14, wherein the controller is configured to monitor a load experienced by the generator when the plurality of variable-pitch fan blades are moved to the power-generation orientation and to adjust engagement of the torque transmitting device based on the monitored load.

16. An aircraft comprising
an airframe,
a gas turbine engine supported by the airframe, and
a first fan module and a second fan module supported by the airframe, each fan module having
a fan rotor selectively coupled to the gas turbine engine and mounted for rotation about a central axis, the fan rotor having a plurality of variable-pitch fan blades each movable from a thrust-generation orientation to a power-generation orientation, and
a power supply system including a torque transmitting device configured to couple the fan rotor to the gas turbine engine so that the gas turbine engine drives rotation of the fan rotor when the plurality of variable-pitch fan blades are in the thrust-generation orientation, a generator coupled to the fan rotor and configured to produce electrical power in response to a mechanical load applied by the fan rotor to the generator, and a controller coupled to the torque transmitting device and the generator,
wherein the controller is configured to disengage the torque transmitting device to de-couple the fan rotor of the first fan module from the gas turbine engine and to cause movement of the variable-pitch fan blades of the first fan module to the power-generation orientation so that the mechanical load is applied to the generator from the fan rotor of the first fan module in response to the fan rotor of the first fan module being driven by ram air while the second fan module remains coupled to the gas turbine engine with the plurality of variable-pitch fan blades in the thrust-generation orientation.

17. The aircraft of claim 16, wherein the gas turbine engine is located forward of the fan module along the central axis.

18. The aircraft of claim 16, wherein the power supply system includes a second torque transmitting device coupled between the fan rotor and the generator and the controller is configured to engage the second torque transmitting device to transmit rotation from the fan rotor to the generator so that the mechanical load is applied by the fan rotor to the generator to cause the generator to produce electrical power when the variable-pitch fan blades are moved to the power-generation orientation.

19. The aircraft of claim 18, wherein the controller is configured to disengage the second torque transmitting device to de-couple the fan rotor from the generator so that the mechanical load is not applied by the fan rotor to the generator and the generator does not produce electrical power when the plurality of variable-pitch fan blades are in the thrust-generation orientation.

20. The aircraft of claim 19, the controller is configured to monitor a load experienced by the generator when the plurality of variable-pitch fan blades are moved to the power-generation orientation and to adjust engagement of the second torque transmitting device based on the monitored load.

* * * * *